Sept. 3, 1957            H. E. PEREZ            2,805,080
SWAY-COUNTERACTING ARRANGEMENT FOR MOTOR VEHICLES
Filed Aug. 30, 1956            2 Sheets-Sheet 2
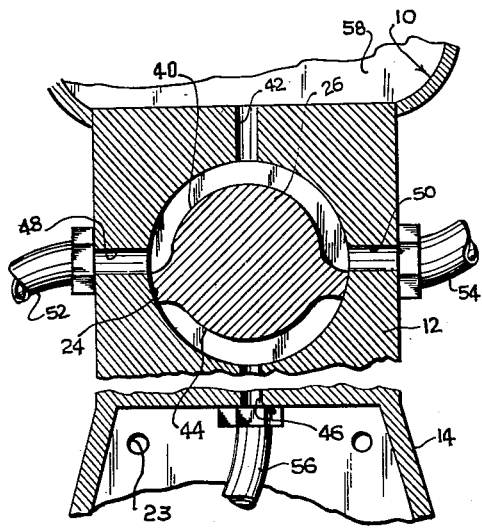
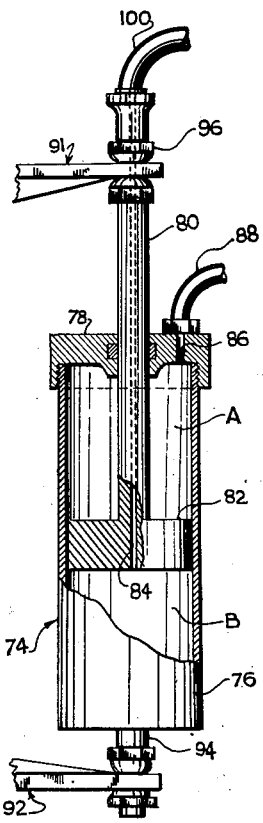
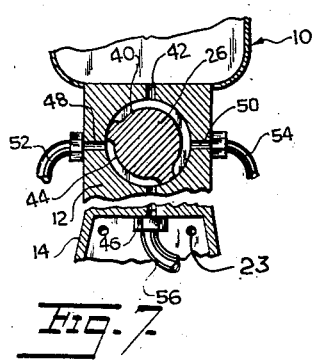
*INVENTOR.*
HORACIO E. PEREZ
BY
*ATTORNEY*

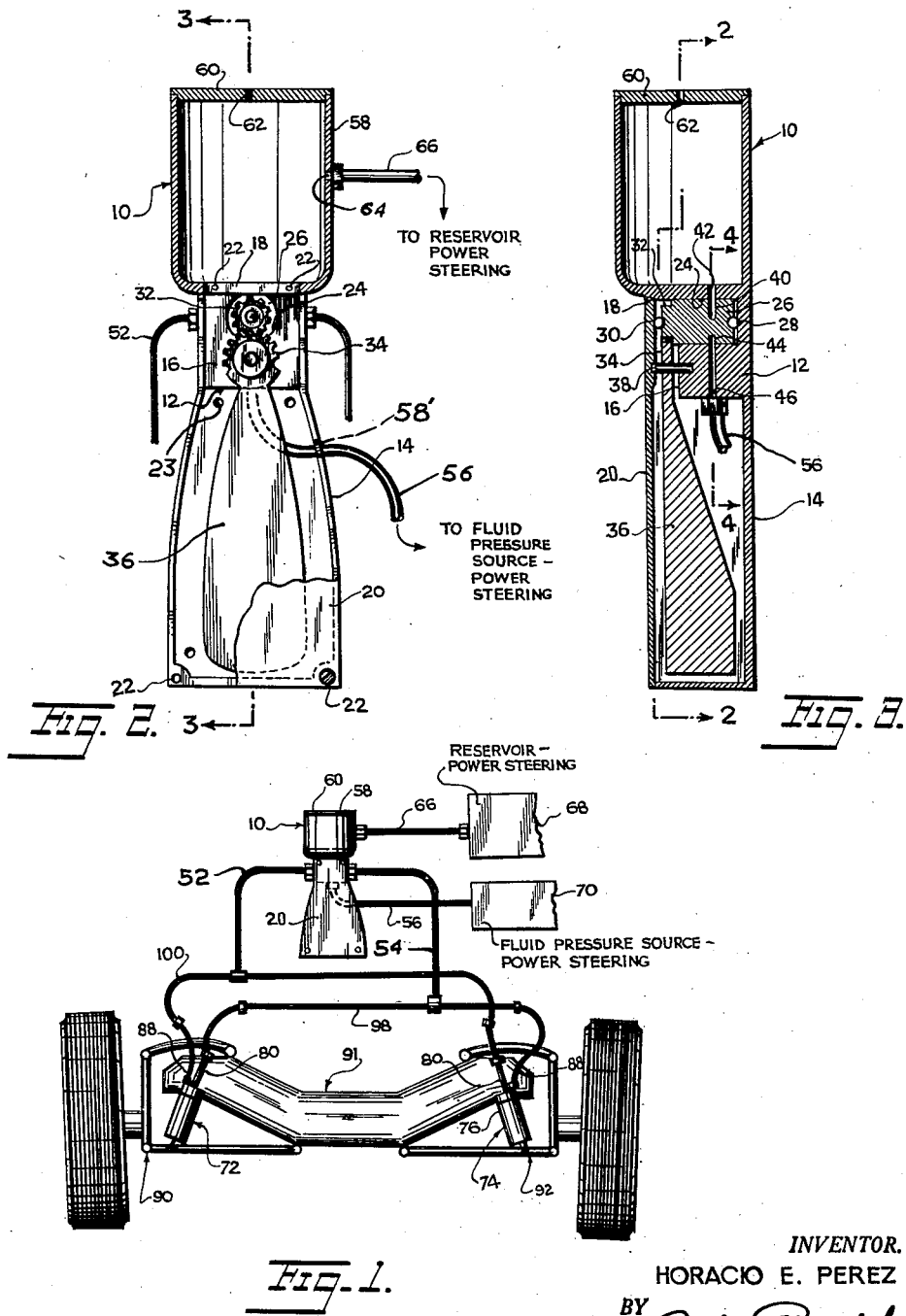

United States Patent Office 2,805,080
Patented Sept. 3, 1957

2,805,080

SWAY-COUNTERACTING ARRANGEMENT FOR MOTOR VEHICLES

Horacio E. Perez, Valhalla, N. Y.

Application August 30, 1956, Serial No. 607,247

6 Claims. (Cl. 280—112)

The present invention relates to a device for controlling, that is, counteracting or minimizing, the tendency of the body of a vehicle to sway laterally in one direction or another as the vehicle rounds a curve, which sway is caused by centrifugal forces acting upon said body tending to deflect and tilt the body laterally relative to the vehicle frame. The device will also be effective in preventing excessive leaning when the vehicle is on the side of a road having a high crown.

The desirability of a device for controlling vehicle body sway in the manner referred to may be readily appreciated, in view of the discomfort resulting when a vehicle body shifts laterally and tilts in the manner described.

One important object of the present invention is to provide a device which will have the adaptability for automatically minimizing body sway when a vehicle rounds a curve.

Another important object is to provide a device which will counteract the dangerous tendency of the vehicle to overturn as the center of gravity is raised and shifted by the tilting of the vehicle body.

Another object is to provide a sway control device as stated which will be very simply designed, as to be capable of installation in a vehicle already in use, without requiring modification or redesign of the vehicle, the device being designed as an accessory or attachment for accomplishing this purpose. The device is designed, however, so as to be also capable of installation in a vehicle during the manufacture thereof.

Another object is to provide a sway control device as stated which can be associated with a power steering system, should the vehicle be equipped with one.

Another object is to provide a sway control device which will be designed to be used, without requirement of doing anything more than capping outlets provided therein, on a vehicle not equipped with power steering.

Yet another object of importance is to so form the device as to include shock absorbent cylinders of simple design that can be used either independently of or in substitution for shock absorbers now in use.

A further object of importance is to provide, in the device, hydraulic cylinders which discharge the function of shock absorbers even when not employed for the purpose of counteracting sway during the rounding of a curve.

A further object is to provide, in the cylinders, a damping effect increasing in direct proportion to the vertical velocity of the wheels, thus making for roadability at high speeds and a "soft" ride at slower speeds.

A further object of importance is to so design the system that the cylinders become, in effect, almost rigidly constituted members when sway develops, to counteract the sway that would ordinarily result from the centrifugal forces developed.

Further objects of importance are to provide a system which will be entirely automatic in operation; will require no attention except for the occasional checking of the fluid in the reservoir; will be adapted for use in the front wheels only or on all four wheels, according to the design of the vehicle on which the device is mounted; will permit the use of softer springs without reducing stability and roadability of the vehicle at higher speed; will permit the same connections and lines that are used in modern hydraulic brake systems to be employed in the invention; and will be adapted to automatically maintain fluid level with the construction being such that when power assist is used, excess fluid will automatically be returned to the power steering reservoir.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a schematic representation of the sway control system associated with a vehicle.

Fig. 2 is an enlarged view of the valve assembly taken substantially on line 2—2 of Fig. 3, showing the device partly in front elevation and partly in section.

Fig. 3 is a longitudinal section substantially on line 3—3 of Fig. 2.

Fig. 4 is an enlarged, detail section substantially on line 4—4 of Fig. 3 showing the valve construction and the connections therewith, the valve being in its normal, neutral position.

Fig. 5 is a view partly in side elevation and partly in longitudinal section of one of the wheel suspension unit cylinders, the vehicle frame being shown fragmentarily.

Figs. 6 and 7 are views similar to Fig. 4 on a reduced scale showing the valve in different positions assumed thereby during the counteracting of developed sway.

Referring to the drawings in detail, designated generally at 10 is a valve assembly. This includes a rectangular valve body 12 integral with a depending, forwardly opening, elongated, pendulum housing 14 which is increased progressively in width in the direction of its lower extremity. The front face 16 of valve body 12 is recessed within the housing 14 as shown in Fig. 3, and integrally formed on the valve body and projecting forwardly from the top edge thereof is an overhang 18 flush at its front edge with the front edge of housing 14. A flat cover plate 20 is formed with apertures receiving screws 22 threaded into the overhang 18 and into the wall of housing 14 to normally close the open front of the housing. Screw-threaded openings 23 may be provided in the rear wall of the housing for fastening same to the vehicle.

In the upper portion of valve body 12 there is formed a forwardly opening, cylindrical cavity or recess 24 opening upon the front face 16 of body 12 to receive a complementarily formed valve core 26 freely rotating in the cavity through the provision of end bearings 28, 30 seating in confronting recesses provided in the cover plate and in the front end of the valve core, and in similar recesses formed in the rear or inner end surface of the valve core and the inner wall of the cavity 24.

Integrally formed upon the projecting front end of the rotatable valve member or core 26 is a gear 32, in mesh with gear teeth 34 provided upon a flat, generally circular enlargement formed upon the upper end of a pendulum 36 adapted to swing within the housing, about an axis defined by a pivot pin 38 engaged at its ends in the cover plate and valve body respectively and passing through the center of the toothed enlargement.

Referring to Fig. 4, formed in the valve member 26 is a transverse groove 40 extending through substantially 180° of the valve member circumference, across the top of the valve member. Communicating with groove 40 is a bore or port 42 formed in the valve body.

Also extending transversely of the valve member, about the circumference thereof, is a blind groove 44, communicating with a bore or port 46 aligned with the bore 42. Angularly spaced ninety degrees from the bores or ports 42, 46 are aligned bores or ports 48, 50 which normally communicate with the opposite ends of the groove 40. Connected in communication with bores 48, 50 are hoses or similar tubular connections 52, 54. A hose 56 is connected to the underside of the valve body, in communication with the bore 46, and as shown in Fig. 2 passes out of the housing 14 through an opening 58' formed in the side wall of the housing.

Integral with the valve body 12 and projecting upwardly therefrom is an overflow chamber or reservoir 58, closed at its upper end by a cap 60 having an air vent 62. At the side of reservoir 58 there is a port 64 connected in communication with a hose 66 extending to the conventional fluid reservoir system of the power steering system of the vehicle. Hose 56, as shown in Fig. 1, is similarly connected to the conventional source of fluid pressure 70 of the power steering system of the vehicle.

Referring now to Figs. 1 and 5, the system or apparatus constituting the invention includes, on each wheel suspension unit, a hydraulic cylinder. The cylinders, though identical, are generally designated 72, 74 for better identification thereof during the discussion of the operation which will follow herein.

Since the cylinders are identical, the decription of one will suffice for both.

As shown in Fig. 5, each cylinder includes a hollow cylinder body 76, closed at its upper end by a cap 78. Cap 78 has a center opening, in which is slidable a piston rod 80 having within the body 76 a piston 82. An axial bore 84 extends through the piston rod and through the piston. The piston 82 defines within the cylinder body an upper chamber A and a lower chamber B.

In cap 78 there is formed a port 86, and connected in communication therewith is a tubular connector 88.

The frame of the vehicle has been generally designated at 91, while the individual wheel suspension units mounted on opposite sides of the frame and wholly conventional per se have been generally designated at 90, 92, respectively. Since the frame and the wheel suspension unit of the vehicle are wholly conventional per se, they are illustrated only diagrammatically herein.

At its lower end, the cylinder body 76 is connected 94 to the adjacent wheel suspension unit. In this regard, the illustrated connections are shown purely by way of example, and any conventional connection employed for the purpose of joining shock absorbers to wheel suspension units of vehicles may be employed. It is mainly important that any suitable connection be provided that will connect the piston rods to the vehicle frame, with the cylinder body connected to the wheel suspension unit as shown in Fig. 5, for retraction or extension of the piston rod during movements of the vehicle frame and wheel dispensing unit toward and away from each other respectively, at a particular side of the vehicle.

The connection 96 of the piston rod to the vehicle frame is tubular, to connect the bore 84 of cylinder unit 74 in communication with a hose 100. Similarly, as shown in Fig. 1, a hose 98 is connected in communication with the hose 88 of cylinder unit 74. Hose 98 at its other end is connected in communication with the bore of piston rod 80 of cylinder unit 72, while hose 100 is connected at its other end in communication with the hose 88 of cylinder unit 72.

As shown in Fig. 1, the hose 52 is connected between bore 48 and hose 100, while hose 54 is connected between bore 50 and hose or tube 98.

It will be understood that the valve assembly can be located in any part of the vehicle, and preferably would be mounted at as high an elevation as possible under the hood and as near the center of the vehicle as is practical.

In use of the device, the entire system is filled with a suitable pressure fluid such as odinary braking or power steering fluid. The system, when thus completely filled with suitable fluid, includes two double-acting cylinders mounted as shock absorbers and opposing each other. The upper chamber A of cylinder unit 74 is connected in communication with the lower chamber B of cylinder unit 72 while the lower chamber B of cylinder unit 74 is connected in communication with the upper chamber A of cylinder unit 72.

Tube 66 is an overflow tube, and is connected to the reservoir of the power steering system of the vehicle, while tube 56 is connected to the power or output side of said power steering system. If the device is not to be used on a vehicle having power steering, or if it is not to be connected with the power steering system of the vehicle, the overflow port 64 and the port 46 are capped or plugged.

When the vehicle is riding level, as for example on a straightaway portion of the road, the chambers A, B of the cylinder units are connected through the medium of the tubes 98, 100, to the tubes 54, 52 respectively. Under these circumstances, the valve member is disposed as shown in Fig. 4, with tubes 52, 54 in communication with opposite ends of the connecting groove 40 of the valve member. Valve groove 40, in turn, is connected through the medium of bore 42 to the overflow reservoir 58.

Although the system is also connected to a source of fluid pressure through the tube 56, the blind groove 44 maintains said source inactive so far as the invention is concerned, while the vehicle is in its normal level position. Therefore, any usual up or down motion of the respective wheels as the car travels along the road surface is permitted with the usual damping effect of conventional shock absorbers being taken care of by the cylinder units 72, 74.

Since the motion of the pistons of the cylinder unit is made possible through the movement of the fluids through the several arms described, as well as through the fluid lines and through the valve to run from the reservoir 58, the damping resistance of the system increases in direct proportion to the vertical velocity of the wheels. Thus, at slow speeds the damping force is at a minimum, permitting as soft a ride as the springs of the vehicle will permit. At higher speeds, the damping force increases in direct proportion to the mentioned vertical velocity of the wheels, to provide a stiffer ride, to improve the roadability of the vehicle.

The operation of the system, so far, has been described with reference to a straight path of the vehicle. It will now be assumed that the vehicle begins to turn to the left in Fig. 1.

The centrifugal force developed in such a turn causes the body of the vehicle, not shown, to sway to the right. At the same time, said centrifugal force causes the pendulum 36 to swing to the right in Fig. 2. By means of the gears 34, 32, the valve member 26 is caused to rotate clockwise in Figs. 2 and 6. This immediately closes the port 48. However, port 50 remains connected to the overflow reservoir 58, so that no change occurs in the lower chamber B of cylinder unit 72 and in the upper chamber A of cylinder unit 74.

The closing of the port or bore 48 prevents the flow of fluid out of its side of the fluid system, that is, flow of the fluid is at this point restricted within tube 52, tube 100, upper chamber A of cylinder unit 72, and lower chamber B of cylinder unit 74. Thus, the downward pressure exerted in the lower chamber B of cylinder 74 will be transmitted through tube 100 to the upper chamber A of cylinder 72. However, since the centrifugal force which has caused a downward pressure within cylinder 74 is causing a similar upward pull within cylinder 72, the force transmitted to tube 100 from cylinder 74 will be neutralized by the force developed in the upper chamber A of cylinder 72. Therefore, the swaying tendency of the vehicle is, to all practical purposes, eliminated.

The reference to a "downward force" within cylinder 74 is with regard to the tendency of the piston rod 80 to move downwardly because of its connection to the right-hand side of the frame 91, viewing the same as in Fig. 1, when the vehicle body connected to the frame tends to tilt to the right in Fig. 1 as centrifugal force develops. By the same token, the reference to an "upward force" within cylinder 72 has regard to the upward movement of the left-hand side of the frame in Fig. 1 relative to the wheel suspension unit, again caused by the swaying of the vehicle body to the right in Fig. 1.

Should the system be connected with the power steering system of the vehicle as shown, as the valve member 26 rotates clockwise as viewed in Fig. 4 to close the port 48 as shown in Fig. 6, it will, eventually, bring blind groove 44 in communication with port 48. This connects port 48 with port 46 in the manner shown in Fig. 7. Up to this point, port 48 has been completely closed as in Fig. 6 when the vehicle begins to react to the developed centrifugal forces as a curve is rounded.

Therefore, as soon as groove 44 is in its Fig. 7 position, the source of fluid pressure 70 is connected, through hose or tube 52, and tube 100, to the upper chamber A of cylinder 72 and the lower chamber B of cylinder 74. Thus, the added fluid under pressure increases the total volume of fluid in this side of the system, resulting in a positive upward movement of the piston rod 80 of cylinder 74, and a corresponding downward movement of piston rod 80 of cylinder 72. Thus the body of the vehicle, should any sway develop, is returned by positive action of the apparatus to a level position.

When the vehicle returns to its normal, level position, pendulum 36 will return to its normal or neutral position shown in Fig. 2. This rotates the valve member counter-clockwise, back to its normal position shown in Fig. 4, closing the port 46 and communicating port 48 with reservoir 58. At this point, the fluid volumes in both sides of the system will be equalized and any loss will be replaced automatically from the reservoir 58.

When the device is connected with the power steering system, one side of the system will have a greater volume of fluid which will be returned to the reservoir 58 in the manner just described. In this event, the total amount of the fluid in the reservoir 58 will gradually increase and as this occurs, the excess fluid will flow through the overflow port 64 and through the tube 66 to the reservoir 68 of the power steering system. As a result, any fluid borrowed from the power steering system is quickly and automatically returned to its reservoir.

Of course, the system operates identically, though oppositely, when, viewing the vehicle as in Fig. 1, the body tends to sway to the left in this figure on turning of the vehicle to the right.

It will be seen that the apparatus is inexpensively designed, and can be readily installed as an accessory on vehicles already in use. Further, the device is adapted to make use of the power steering system to provide forces additive to those developed inherently in the invention, to positively counteract body sway of the vehicle. Even when the device is not used in association with a power steering system, the apparatus will of course act efficiently to minimize sway and to provide shock absorbent means for cushioning the ride of the vehicle.

In the illustrated example, the device has been shown mounted upon a vehicle having only its front wheels independently suspended. The device can of course be used on vehicles having independent suspension on the rear wheels or can be used on all four wheels of heavy vehicles having a high center of gravity.

In any event and regardless of the number of cylinders used, only one valve assembly is necessary since the front and rear cylinders of the same side of the vehicle are connected before reaching the proper side of the valve assembly.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a housing, rectangular in shape, a rotatable valve member in said housing arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the assembly further including a pendulum operatively connected with the valve member in said housing and swingingly responsive to centrifugal force to impart movement of the valve member in response to the centrifugal force, the pendulum including a gear at one end and the valve member including a gear segment meshing with the first gear, for rotating the valve member responsive to swinging movement of the pendulum.

2. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a housing, rectangular in shape, a rotatable valve member in said housing arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the assembly further including a pendulum operatively connected with the valve member in said housing and swingingly responsive to centrifugal force to impart movement of the valve member in response to the centrifugal force, the pendulum including a gear at one end and the valve member including a gear segment meshing with the first gear, for rotating the valve member responsive to swinging movement of the pendulum, said valve assembly including a fluid reservoir above the valve member connected by the valve member in communication with said second lines to maintain a constant volume of fluid throughout the system and to receive the overflow of fluid from one or both of the second lines, said reservoir having an outlet port therein.

3. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a valve member arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the assembly further including a pendulum operatively connected with the valve member and swingingly responsive to centrifugal force to impart movement of the valve member in response to the centrifugal force, the pendulum including a gear and the valve member including a gear meshing with the first gear, for rotating the valve member responsive to swinging movement of the pendulum, said valve assembly including a reservoir above the valve member connected by the valve member in communication with said second lines to maintain a constant volume of fluid throughout the system and to receive the overflow of fluid from one or both of the second lines, the valve member including a circumferentially extending groove, the valve assembly including ports normally in communication with said groove and communicating with the respective second lines to provide the connection between the second lines through the valve member, the reservoir having a port communicating with said groove.

4. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a valve member arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the assembly further including a pendulum operatively connected with the valve member and swingingly responsive to centrifugal force to impart movement of the valve member in response to the centrifugal force, the pendulum including a gear and the valve member including a gear meshing with the first gear, for rotating the valve member responsive to swinging movement of the pendulum, said valve assembly including a reservoir above the valve member connected by the valve member in communication with said second lines to maintain a constant volume of fluid throughout the system and to receive the overflow of fluid from one or both of the second lines, the valve member including a circumferentially extending groove, the valve assembly including ports normally in communication with said groove and communicating with the respective second lines to provide the connection between the second lines through the valve member, the reservoir having a port communicating with said groove, said valve member further having a second groove separate from the first groove and a port communicating with the second groove and adapted to be connected in engagement with a source of fluid pressure, said second groove being movable in communication with one of the ports connected with the second lines responsive to rotation of the valve to connect the source of fluid pressure with said one port.

5. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a valve member arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the assembly further including a pendulum operatively connected with the valve member and swingingly responsive to centrifugal force to impart movement of the valve member in response to the centrifugal force, the pendulum including a gear and the valve member including a gear meshing with the first gear, for rotating the valve member responsive to swinging movement of the pendulum, said valve assembly including a reservoir above the valve member connected by the valve member in communication with said second lines to maintain a constant volume of fluid throughout the system and to receive the overflow of fluid from one or both of the second lines, the valve member including a circumferentially extending groove, the valve assembly including ports normally in communication with said groove and communicating with the respective second lines to provide the connection between the second lines through the valve member, the reservoir having a port communicating with said groove, said valve member further having a second groove separate from the first groove and a port communicating with the second groove and adapted to be connected in engagement with a source of fluid pressure, said second groove being movable in communication with one of the ports connected with the second lines responsive to rotation of the valve to connect the source of fluid pressure with said one port, the reservoir having an overflow port adapted for connection in communication with a reservoir associated with said source of fluid pressure.

6. A device for counteracting the tendency toward lateral sway of the body of a vehicle of the type including a frame to which the body is secured and wheel units suspended from the frame at opposite sides thereof, comprising shock absorbent, hydraulic, telescopic cylinder units connected between each side of the frame and the suspension unit at the same side, and means operatively responsive to a centrifugal force developed in a direction to tilt the body toward one side of the vehicle to prevent telescopic action of the cylinder units in the direction of said one side and thereby minimize the tilting of the vehicle body, each cylinder unit including a cylinder body and a piston working therein to divide the cylinder body into upper and lower chambers, said cylinder units including first lines connecting the upper chamber of one cylinder unit to the lower chamber of the other cylinder unit and the upper chamber of said other cylinder unit to the lower chamber of said one cylinder unit, said means including second lines extending from the respective first lines and further including a valve assembly, the valve assembly including a valve member arranged to normally connect the second lines in communication with each other for free flow of fluid between the several chambers of the cylinder units, said valve member responding to centrifugal force to close one of the second lines to prevent flow of fluid through said one second line, thus restricting the flow of fluid within the first line in the direction of the sway, and the chambers being connected with said first line, thereby to prevent telescopic action of both cylinder units in the direction of the sway, the piston of each cylinder unit having an axial bore communicating between the lower chamber of the unit and one of the first lines, each cylinder unit further including a cap for the upper chamber having a port connected in communication with the other first line and with the upper chamber of the cylinder unit.

References Cited in the file of this patent

UNITED STATES PATENTS

| | | |
|---|---|---|
| 2,684,254 | Goss | July 20, 1954 |
| 2,743,941 | Walker | May 1, 1956 |

FOREIGN PATENTS

| | | |
|---|---|---|
| 518,848 | Great Britain | Mar. 8, 1940 |